US010956020B2

(12) United States Patent
Teng

(10) Patent No.: US 10,956,020 B2
(45) Date of Patent: Mar. 23, 2021

(54) TECHNIQUES TO DISPLAY AN INPUT DEVICE ON A MOBILE DEVICE

(71) Applicant: Intel Corporation, Santa Clara, CA (US)

(72) Inventor: Arther Sing Hook Teng, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/854,108

(22) Filed: Dec. 26, 2017

(65) Prior Publication Data

US 2018/0121051 A1 May 3, 2018

Related U.S. Application Data

(63) Continuation of application No. 13/189,706, filed on Jul. 25, 2011.

(51) Int. Cl.
*G06F 3/0488* (2013.01)
*G06F 1/16* (2006.01)
(52) U.S. Cl.
CPC .......... *G06F 3/0488* (2013.01); *G06F 1/1698* (2013.01); *G06F 3/04886* (2013.01)

(58) Field of Classification Search
CPC ... G06F 3/0488; G06F 3/04886; G06F 1/1698
See application file for complete search history.

(56) References Cited

U.S. PATENT DOCUMENTS

| 2006/0090122 | A1* | 4/2006 | Pyhalammi | ........ H04N 21/4126 715/202 |
| 2008/0214239 | A1* | 9/2008 | Hashimoto | ........... G06F 3/0481 455/557 |
| 2009/0167716 | A1* | 7/2009 | Wang | ................... G06F 3/04886 345/173 |
| 2010/0138780 | A1* | 6/2010 | Marano | ................. G06F 3/1415 715/804 |
| 2011/0275391 | A1* | 11/2011 | Lee | ..................... H04M 1/7253 455/500 |

FOREIGN PATENT DOCUMENTS

CN 1949905 A 4/2007

* cited by examiner

*Primary Examiner* — Abhishek Sarma
(74) *Attorney, Agent, or Firm* — Kacvinsky Daisak Bluni PLLC

(57) ABSTRACT

A method and system may detect an external display coupled to the mobile device. A digital input device may be presented on the integrated touch sensitive display of the mobile device to operate the mobile device. Multimedia content may be presented on the external display in response to the operation of the mobile device through the digital input device.

28 Claims, 9 Drawing Sheets

TECHNIQUES TO DISPLAY AN INPUT DEVICE ON A MOBILE DEVICE

CROSS-REFERENCE TO RELATED APPLICATIONS

This application is a continuation of, claims the benefit of and priority to previously filed U.S. patent application Ser. No. 13/189,706 filed Jul. 25, 2011, entitled "TECHNIQUES TO DISPLAY AN INPUT DEVICE ON A MOBILE DEVICE", which is incorporated herein by reference in its entirety.

BACKGROUND

Mobile devices are becoming increasingly smaller over time in order to facilitate transport, storage and convenience for a user. Along with the smaller form factors, however, mobile devices typically implement integrated displays with a limited amount of display area. This makes it difficult for a user to view content presented on the smaller integrated displays. To solve this problem, a user may couple a mobile device to an external display, such as a liquid crystal display (LCD) monitor, via a wired or wireless connection. The external display may have a larger amount of display area relative to the integrated display of the mobile device. In this configuration, content presented on the smaller integrated display of a mobile device may be replicated to the larger external display to enhance viewing by a user.

Despite the larger image presented by the larger external display, the smaller integrated display of the mobile device typically continues to present the same view as that shown on the larger external display. This seems redundant given that one purpose of the larger external display is to become a primary viewing device for the mobile device. In some cases, the smaller integrated display may be turned off to conserve power to the mobile device. In both cases, however, the smaller integrated display remains an underutilized resource of the mobile device. It is with respect to these and other limitations that the present improvements are needed.

DETAILED DESCRIPTION

Figure 1:
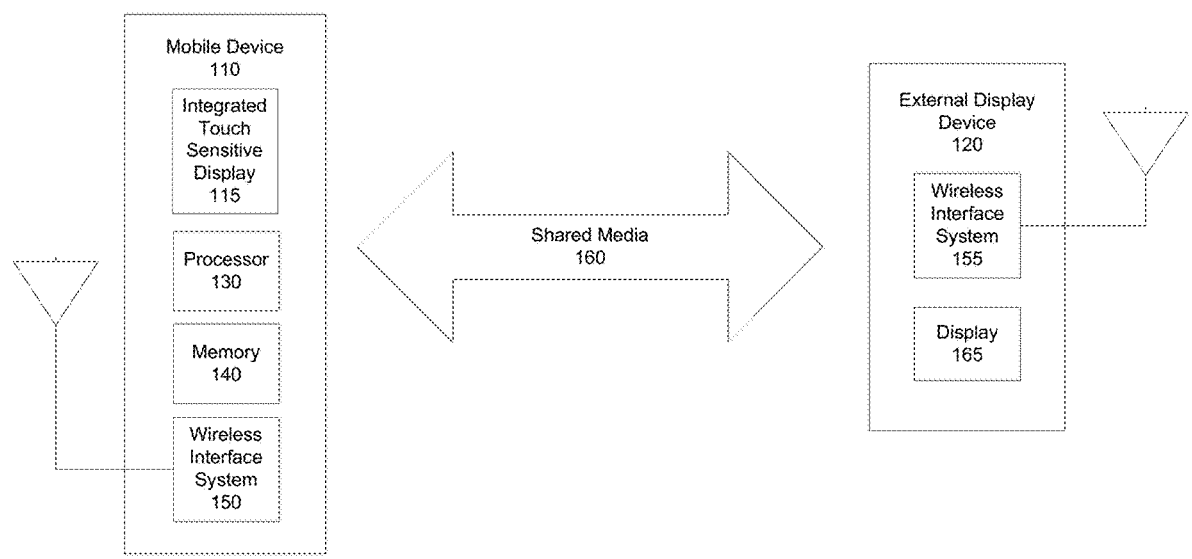
FIG. 1 illustrates an embodiment of an exemplary mobile system.

Embodiments are generally directed to techniques for managing multiple display devices coupled to a mobile device. Some embodiments are particularly directed to techniques for presenting different content on each display device coupled to a mobile device. In one embodiment, for example, a mobile device may detect an external display device. The mobile device may be coupled to the external display device via wired or wireless connections. The mobile device may comprise an integrated touch sensitive display. Furthermore, the mobile device may implement a display manager arranged to present different content on each of the display devices, rather than identical content as presented by conventional solutions.

In an embodiment, for example, the mobile device may detect an external display device. In an embodiment, a display manager may present a digital input device on an integrated touch sensitive display of a mobile device, while simultaneously presenting multimedia content from an application on an external display coupled to the mobile device. In an embodiment, the digital input device presented on an integrated touch sensitive display of a mobile device may operate the mobile device. A digital input device may comprise, for example, a software version of a keyboard, a pointing device, a touch pad, or any other type of physical input device. In this arrangement, the integrated touch sensitive display may be used to replicate functions of a physical input device, without necessarily needing to connect any physical input devices to the mobile device. In this manner, an integrated touch sensitive display for a mobile device may be utilized as a custom input device for the mobile device, rather than simply presenting identical content as that presented on an external display device. As such, an integrated touch sensitive display is converted from a wasted resource to a productive resource of a mobile device.

In an embodiment, multimedia may be presented on the external display. In an embodiment, the multimedia may be presented in response to the operation of the mobile device through the digital input device.

In some cases, a physical input device may be coupled to a mobile device. In such cases, the integrated touch sensitive display may be used to augment functions of the physical input device. For instance, a physical pointing device such as a mouse may be coupled to a mobile device, and used to select content presented on an external display. However, the external display may not provide sufficient resolution or granularity to specifically pin-point content presented on the external display. In this case, the integrated touch sensitive display may provide a more detailed version of an area around a pointer positioned on the external display, thereby allowing a user to select a more precise location within the detailed version by tapping on the integrated touch sensitive display at the desired location. Other use scenarios exist as well.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates a block diagram of one embodiment of a mobile system 100. In various embodiments, the mobile system 100 may comprise multiple nodes. A node generally may comprise any physical or logical entity for communicating information in the mobile system 100 and may be implemented as hardware, software, or any combination thereof, as desired for a given set of design parameters or performance constraints. An example of a node may comprise an electronic device, such as a mobile device or an external display. Another example of a node may comprise a part or component of an electronic device, such as a display adapter or wireless transceiver. Although FIG. 1 may show a limited number of nodes by way of example, it can be appreciated that more or less nodes may be employed for a given implementation.

In various embodiments, the mobile system 100 may comprise, or form part of a wired communications system, a wireless communications system, or a combination of both. For example, the mobile system 100 may include one or more nodes arranged to process and/or communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The mobile system 100 also may include one or more nodes arranged to communicate information over one or more types of wireless communication links, such as shared media 160. Examples of a wireless communication link may include, without limitation, a radio channel, infrared channel, radio-frequency (RF) channel, a High-Definition Multimedia Interface (HDMI) channel, a digital visual interface (DVI) channel, a video graphics array (VGA) channel, a Wireless Fidelity (WiFi) channel, a Wireless Display (WiDi) channel, a portion of the RF spectrum, and/or one or more licensed or license-free frequency bands. In the latter case, the wireless nodes may include one or more wireless interface systems and/or components for wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a microstrip antenna, a diversity antenna, a dual antenna, an antenna array, and so forth. In an embodiment, certain devices may include antenna arrays of multiple antennas to implement various adaptive antenna techniques and spatial diversity techniques.

In various embodiments, the mobile system 100 may comprise or be implemented as a mobile broadband communications system. Examples of mobile broadband communications systems include, without limitation, systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In an embodiment, for example, the mobile system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e Cor2/D3-2005) are Physical (PHY) layer specifications. WiMAX II is an advanced Fourth Generation (4G) system based on the IEEE 802.16m and IEEE 802.16j proposed standards for International Mobile Telecommunications (IMT) Advanced 4G series of standards.

In various embodiments, the mobile system 100 may comprise an external display device 120. As illustrated in FIG. 1, the external display device 120 may include, for example a wireless interface system 155 to allow the external display device 120 to communicate in the mobile system 100. In an embodiment, an external display device 120 may include wireless capabilities. The external display device 120 may include a display 165. The display 165 may include, but is not limited to, a plasma, a liquid crystal display (LCD), an organic light emitting diode (OLED) display and/or a red/green/blue (RGB) display, among others. In an embodiment, the display 165 on the external display device 120 may present multimedia content. The multimedia content may include, but is not limited to, text, audio, video, symbols, images and/or animation.

In various embodiments, the mobile system 100 may comprise a mobile device 110. In various embodiments, the mobile device 110 may include an integrated touch sensitive display 115, a processor 130, a memory unit 140, and a wireless interface system 150. The embodiments, however, are not limited to the elements shown in FIG. 1.

An integrated touch sensitive display 115 on the mobile device 110 may comprise any suitable display unit for displaying information on a device. The integrated touch sensitive display 115 may include an organic light emitting diode (OLED) display, a liquid crystal display (LCD), or other glass and/or plastic materials. In an embodiment, the integrated touch sensitive display 115 may provide high brightness and/or contrast and a wide aspect ratio. In an embodiment, the integrated touch sensitive display 115 may display text, symbols and/or images. In an embodiment, the integrated touch sensitive display 115 may include a monochromatic display. In an embodiment, the integrated touch sensitive display 115 may include a red/green/blue (RGB) display.

In an embodiment, the integrated touch sensitive display 115 may be suitable to present one or more graphical user interface (GUI) views generated by a GUI component of an application program or system program (e.g., an operating system). In an embodiment, the integrated touch sensitive display 115 may be implemented as a touch screen, touch panel, touch screen panel, and so forth. Touch screens may comprise display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. In an embodiment, for example, integrated touch sensitive display 115 may be implemented by a liquid crystal display (LCD), plasma, projection screen or other type of suitable visual interface.

In various embodiments, the integrated touch sensitive display 115 may to determine when a user is touching the integrated touch sensitive display 115. In an embodiment, the integrated touch sensitive display 115 may receive information via a physical touch, such as, but not limited to, a touch from a virtual pen or a user's finger. The embodiments are not limited in this context.

As shown by the mobile device 110, the mobile device 110 may comprise a processor 130. The processor 130 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 130 may be implemented as a general purpose processor, such as a processor made by Intel® Corporation, Santa Clara, Calif. The processor 130 may be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the mobile device 110, the mobile device 110 may comprise a memory unit 140. The memory unit 140 may comprise any machine-readable or computer-readable media capable of storing data, including both volatile and non-volatile memory. For example, the memory unit 140 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory unit 140 may be included on the same integrated circuit as the processor 130, or alternatively some portion or all of the memory unit 140 may be disposed on an integrated circuit or other medium, for example a hard disk drive, that is external to the integrated circuit of the processor 130. In an embodiment, the memory unit 140 may include data and instructions to operate the processor. The embodiments are not limited in this context.

In various embodiments, the mobile device 110 and the external display device 120 may communicate information over shared media 160 via respective wireless interface systems 150, 155. The shared media 160 may comprise one or more allocations of RF spectrum. The allocations of RF spectrum may be contiguous or non-contiguous. In some embodiments, the wireless interface systems 150, 155 may communicate information over the shared media 160 using various multicarrier techniques utilized by, for example, WiFi, WiDi, general packet radio service (GPRS), long term evolution (LTE) technologies, WiMAX and/or WiMAX II systems. In general operation, the wireless interface system 150, 155 may communicate information using one or more communications channels. A communication channel may be a defined set of frequencies, time slots, codes, or combinations thereof.

The mobile device 110 may be coupled to the external display device 120 over the shared media 160. One or more logical or physical channels may be established to communicate information. The information may include media information and control information. Media information may refer to any data representing content meant for a user. Examples of content may include, for example, data from a voice conversation, videoconference, streaming video, electronic mail ("e-mail") message, voice mail message ("voice message"), alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner.

Figure 2:
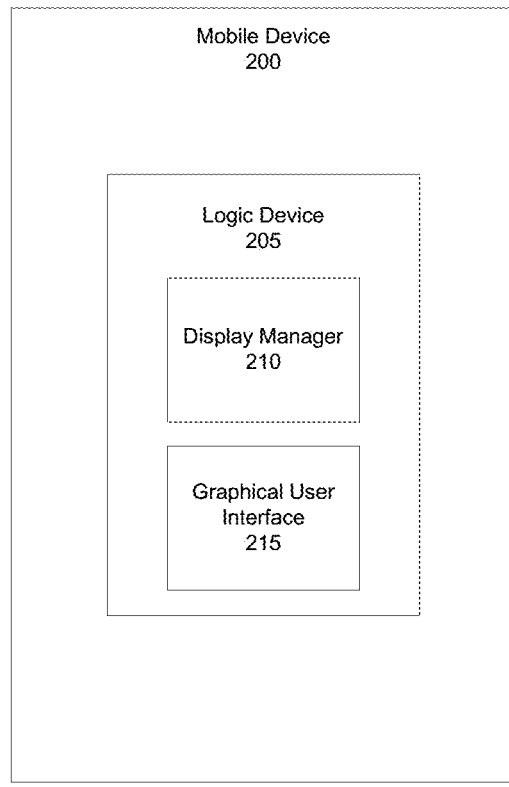
FIG. 2 illustrates an embodiment of a system within a mobile device.

FIG. 2 illustrates a system within the mobile device 200. In an embodiment, a mobile device 200 may include a logic device 205. The logic device 205 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In an embodiment, the logic device 205 may be operative to detect that an external display is coupled to the mobile device. In an embodiment, the logic device 205 may be operative to detect that a physical external input device is coupled to the mobile device. In an embodiment, the external display and/or the physical external input device may be coupled via wires or wirelessly.

The logic device 205 may include a display manager 210. The display manager may be operative on the logic device. The display manager 210 may manage content presented on multiple displays. In an embodiment, the display manager 210 may manage content on the integrated touch sensitive display for the mobile device. In an embodiment, the display manager 210 may manage content on the external display for the mobile device.

In an embodiment, the display manager 210 may present multimedia content on an external display. As discussed above, multimedia content may include, but is not limited to, text, audio video, symbols, images and/or animation.

In an embodiment, the display manager may use a graphical user interface (GUI) 215 to present a digital input device on an integrated touch sensitive display for the mobile device 200. In an embodiment, the GUI component 215 may generate one or more GUI views on the integrated touch sensitive display. The GUI component 215 may provide one or more images on the integrated touch sensitive display of the mobile device with which a user can interact.

Figure 3A:
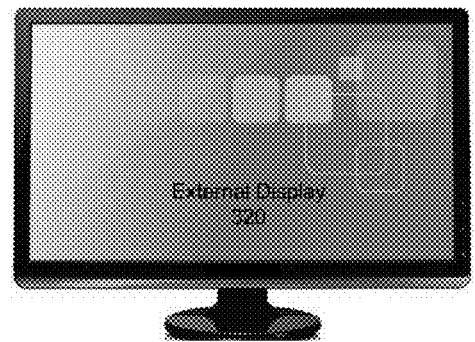
FIGS. 3A-C illustrate embodiments of exemplary mobile systems.
Figure 3A:
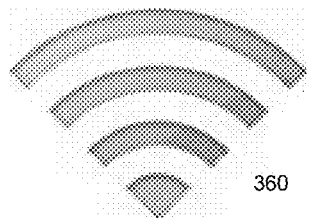
Figure 3A:
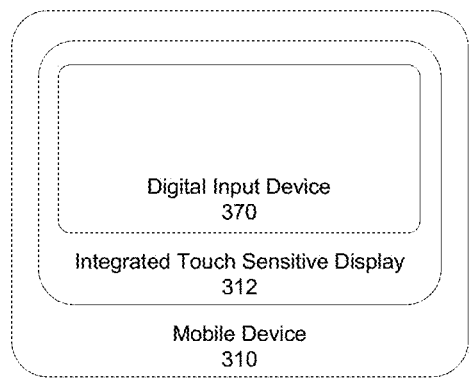

FIGS. A-C illustrate block diagrams of possible embodiments of a mobile system 300. FIG. 3A illustrates a block diagram of an embodiment of a mobile system 300. In the illustrated embodiment shown in FIG. 3, the mobile system 300 may include a mobile device 310 and an external display 320 for the mobile device 310. The external display 320 may be coupled to the mobile device 310 via a connection 360. In an embodiment, the connection 360 may be over the shared media 160, as shown in FIG. 1. In an embodiment, the connection 360 may be a wireless connection. In an embodiment, the mobile device 310 may connect 360 to the external display 320 using a Wireless Display (WiDi) channel. Examples of an external display 320 may include, but are not limited to, a television screen and/or a computer monitor.

A mobile device 310 may include, but is not limited to, a laptop, a notebook, a handheld computer, a handheld enclosure, a portable electronic device, a mobile Internet device (MID), a tablet, a computing device with a touch screen, a slate and/or a personal digital assistant. The embodiments, however, are not limited to these examples. The mobile device 310 may include an integrated display 312. As discussed above, the integrated touch sensitive display 312 may be implemented as, but is not limited to, a touch screen, touch panel and/or touch screen panel.

When the mobile device 310 is coupled to the external display 320, the external display 320 may replicate the multimedia content currently displayed on the integrated touch sensitive display 312 of the mobile device 310. As discussed above, the multimedia content may include, but is not limited to, text, images, audio and video. Once the external display 320 and the mobile device 310 are coupled, the mobile device 310 may present a digital input device on the integrated touch sensitive display 312 while the external display 320 may continue to present the multimedia content.

In an embodiment, the combination of the external display 320 and the integrated touch sensitive display 312 of the mobile device 310 can mimic a desktop computer being docked with various input/output devices. For example, the external display 320 may function as the primary display while the integrated touch sensitive display 312 of the mobile device 310 may function as an input device.

An input device is a device which provides information to a processing device. Input devices may include, but are not limited to, a keyboard, a pointing device, a touch pad, a composite device, an imaging device and/or a video device. Further examples of input devices may include, but are not limited to, a mouse, a track pad, a digital camera, digital recorder, a webcam, a microphone, a scanner, a barcode reader, a pointing stick, a virtual pen, a joystick, a controller, a game controller, a remote, a computer keyboard, a trackball and/or any other type of physical input device. The embodiments, however, are not limited to these examples.

In an embodiment, the integrated touch sensitive display 312 of a mobile device 310 may display an input device. In an embodiment, the input device presented on the integrated touch sensitive display 312 may be referred to as a digital input device 370. The digital input device 370 may comprise hardware and/or software to replicate the functions of an external physical input device. In an embodiment, the digital input device 370 may mimic the functionality of the input device presented on the integrated touch sensitive display 312. A digital input device 370 presented on the integrated touch sensitive display 312 of the mobile device 310 may provide information to the external display 320. Using the digital input device 370 may reduce and/or eliminate the need to couple the mobile device 310 to external physical input devices.

For example, an integrated touch sensitive display 312 of the mobile device 310 may display a keyboard as a digital input device 370. A keyboard may be presented on the integrated touch sensitive display to operate the mobile device and the external display may present multimedia content in response to operation of the mobile device through the keyboard. When a user touches a letter on the keyboard presented on the integrated touch sensitive display 312 of the mobile device 310, the letter may appear on the external display 320 as if the user touched that letter on an external keyboard device.

For example, an integrated touch sensitive display 312 of the mobile device 310 may display a trackball as a digital input device 370. A trackball may be presented on the integrated touch sensitive display to operate the mobile device and the external display may present multimedia content in response to operation of the mobile device through the trackball. When a user touches the trackball presented on the integrated touch sensitive display 312, a pointer from the location of the trackball may appear on the external display 320.

For example, an integrated touch sensitive display 312 of the mobile device 310 may display a video remote with one or more of a stop, start, fast forward, rewind and/or play button. A video remote may be presented on the integrated touch sensitive display to operate the mobile device and the external display may present multimedia content in response to operation of the mobile device through the video remote. When a user touches a button on the video remote presented on the integrated touch sensitive display 312, the video remote may stop, start, fast forward, rewind and/or play on the external display 320 based on the user's touch.

The mobile device 310 may function as the input device presented on the integrated touch sensitive display. For example, the input device presented on the integrated touch sensitive display 312 of a mobile device 310 may be a keyboard. The keyboard presented on the integrated touch sensitive display of the mobile device may have the same functionality of an actual keyboard. For example, a user may touch the caps lock key and a letter key presented on the integrated touch sensitive display in order to capitalize a letter. Alternatively or in addition, a user may press multiple keys simultaneously to replicate a keyboard function, such as holding the shift key to capitalize a letter.

Alternatively and or in addition, the mobile device 310 may mimic the functionality of an external physical input device via one or more visual images, sounds and/or vibrations. The mobile device 310 may provide sensory output such as, but not limited to, output for a user's sense of sight, hearing and touch. The sensory output from the integrated touch sensitive display 312 of the mobile device 310 may assist the user in using the digital input device 370.

In an embodiment, the integrated touch sensitive display 312 of the mobile device 310 may mimic the functionality of an external physical input device via a visual depiction. For example, the integrated touch sensitive display 312 of the mobile device 310 may display a keyboard as a digital input device 370. The integrated touch sensitive display 312 may mimic the keyboard via the visual depiction of the various buttons of a full sized keyboard device. A user may touch a key on the integrated touch sensitive display 312 to mimic the pressing of one or more keys. In an embodiment, the integrated touch sensitive display 312 may mimic a keyboard by displaying a depressed key when the presented key is touched by a user. For example, a user may touch the letter "u" and the letter "u" key presented on the integrated touch sensitive display 312 may show a depressed "u" key. In an embodiment, the integrated touch sensitive display 312 of the mobile device 310 may display a mouse with a scroll wheel. The integrated touch sensitive display 312 of the mobile device 310 may show a visual image of where the mouse previously moved on the integrated touch sensitive display 312. Alternatively or in addition, the integrated touch sensitive display 312 may depict a moving scroll wheel when a user touches the displayed scroll wheel. The examples are not limited to the embodiments described.

In an embodiment, the mobile device 310 may mimic the functionality of an external physical input device via one or more sounds. For example, if the digital input device 370 presented is a keyboard, the mobile device 310 may provide a clicking sound when a user touches a key presented on the integrated touch sensitive display 312. If the digital input device 370 presented is a mouse, the mobile device 310 may provide a clicking sound when a user touches the left and/or right buttons depicted on the displayed mouse. Alternatively or in addition, the mobile device 310 may provide a noise when a user moves a mouse around the integrated touch sensitive display 312. If the digital input device 370 presented is a barcode reader, the mobile device 310 may provide a beeping sound when a barcode is read. The examples are not limited to the embodiments described.

Alternatively or in addition, the integrated touch sensitive display 312 of the mobile device 310 may provide a vibration or sensation to a user when a user touches a part of the presented digital input device 370. In an embodiment, the mobile device 310 may mimic the functionality of the input device via a touch or tactile sensation. In an embodiment, the mobile device may contain a motor and or other tactile technology in order to provide the sensation to a user. For example, if the digital input device 370 presented is a track pad, the mobile device 310 may provide the user with a sensation of the ball of a tack pad rolling across the integrated touch sensitive display 212. If the input device presented is a mouse, the mobile device 310 may provide a vibration when the left and/or right buttons presented on the integrated touch sensitive display 312 are touched by a user. Alternatively or in addition, the mobile device 310 may provide a different vibration when a scrolling wheel of the mouse is touched by a user. If the input device presented is a keyboard, the mobile device 310 may provide a vibration when a key on the integrated touch sensitive display 312 is touched. The examples are not limited to the embodiments described.

Using the integrated touch sensitive display 312 to replicate functions of an external physical input device may eliminate the need to connect one or more physical input devices to the mobile device 310. The integrated touch sensitive display 312 for a mobile device 310 may be utilized as a custom input device for the mobile device 310 and may be a productive resource of a mobile device 310.

Figure 3B:
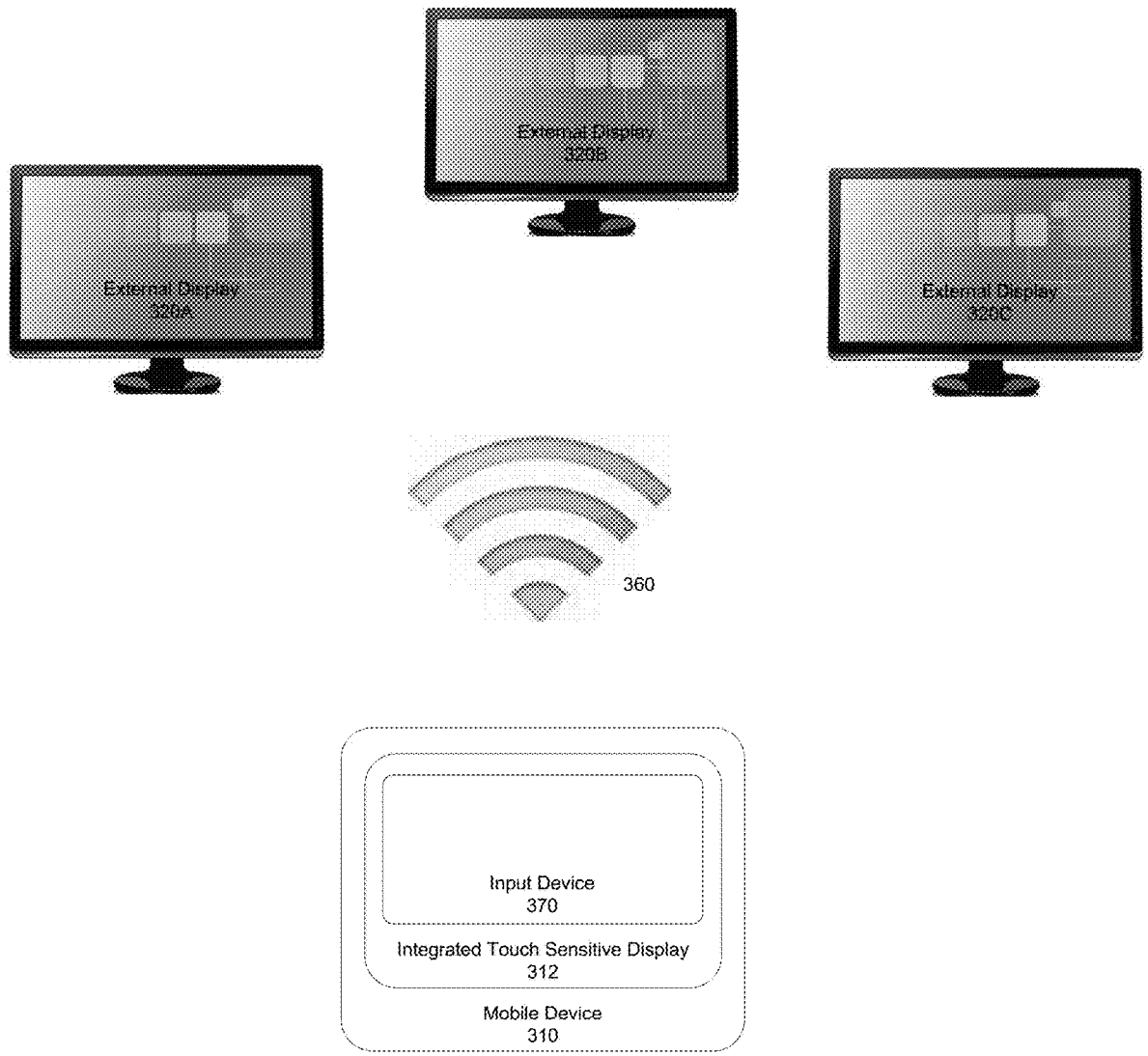

FIG. 3B illustrates a block diagram of an embodiment of a mobile system 300. In an embodiment, a mobile system 300 may include multiple external displays 320A, 320B, 320C coupled to a mobile device 310. In an embodiment, the external display 320A, 320B, 320C may be coupled to the mobile device 310 via a wired or wireless connection. In an embodiment, one or more of the multiple external displays 320A, 320B, 320C may be coupled to the mobile device via a Wireless Display (WiDi) channel.

In an embodiment, one or more of external displays may present multimedia content. In an embodiment, one or more of the external displays 320A, 320B, 320C may present the same multimedia content simultaneously. For example, various external displays 320A, 320B, 320C may present the same multimedia content simultaneously so that users in a large ballroom may view the content, such as a presentation, from wherever they are seated. Alternatively or in addition, one or more external display 320A, 320B, 320C may present at least a portion of the multimedia content. For example, multiple displays may be used together to form one large display presenting the multimedia content. The examples are not limited to the embodiments described.

Figure 3C:
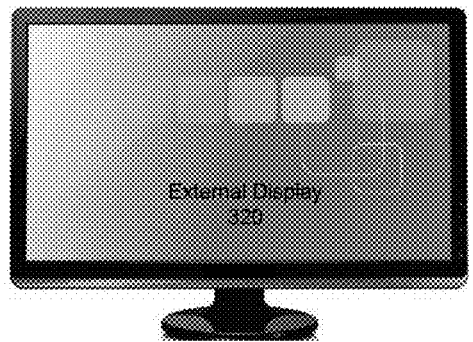
Figure 3C:
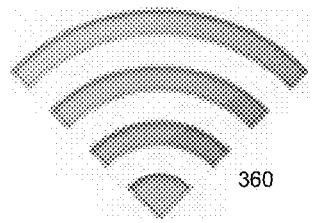
Figure 3C:
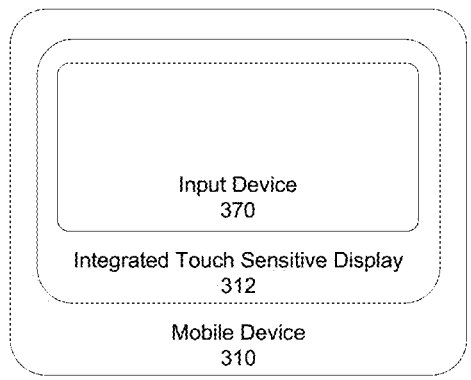

FIG. 3C illustrates a block diagram of an embodiment of a mobile system 300. In an embodiment, an external input 380 may be coupled to a mobile device 310. In an embodiment, the external input 380 may be a physical input device. In an embodiment, the external input 380 may be coupled to the mobile device via a wired or wireless connection. In an embodiment, the external input 380 may be wirelessly coupled to the mobile device using the connection that coupled the mobile device 310 to the external display 320.

In an embodiment, the integrated touch sensitive display 312 on the mobile device 310 may be used to augment and/or enhance functions of the external input 380. For example, an external input 380 may be a physical pointing device such as a virtual pen. The virtual pen 380 may be coupled to a mobile device 310 and may be used to select content presented on an external display 320. However, the external display 320 may not provide sufficient resolution and/or granularity to specifically pin-point content presented on the external display 320. The digital input device 370 on the integrated touch sensitive display 312 of the mobile device 310 may provide a more detailed version of an area around a pointer positioned on the external display 370. This may allow a user to select a more precise location within the detailed version by tapping on the input device 370 on the integrated touch sensitive display 312 at the desired location.

In an embodiment, the integrated touch sensitive display 312 on the mobile device 310 may be used as a supplemental device along with the external input 380. For example, a computer workstation often has multiple external devices such as a keyboard and a mouse. In an embodiment, the mobile system 300 may have a physical keyboard as an external input 280 and the input device 370 on the integrated touch sensitive display 312 of the mobile device 310 may be a mouse. By having the mobile device 310 act as an input device, a computer workstation may be easily simulated without the need for multiple external devices. The examples are not limited to the embodiments described.

Figure 4:
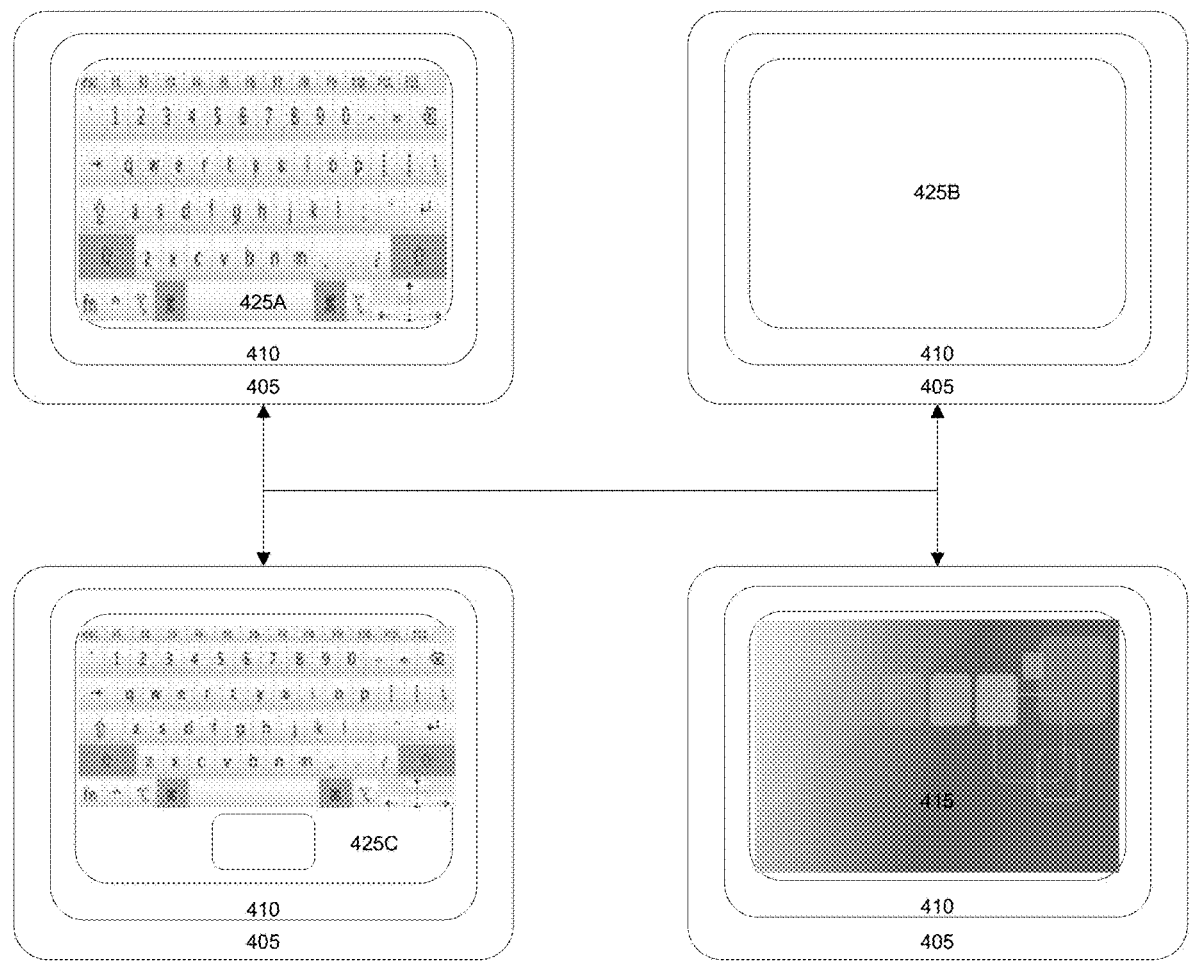
FIG. 4 illustrates exemplary input devices presented on an integrated touch sensitive display of a mobile device.

FIG. 4 illustrates exemplary digital input devices 425A, 425B, 425C presented on an integrated touch sensitive display 410 of a mobile device. As shown in FIG. 4, the integrated touch sensitive display 410 on the mobile device 405 may alternate between various digital input devices 425A, 425B, 425C and the multimedia content 415 while coupled to an external display of the mobile device 405.

In an embodiment, the mobile device 405 may present a keyboard 425A as the digital input device 425 on the integrated touch sensitive display 410. In an embodiment, the integrated touch sensitive display 410 of the mobile device 405 may automatically present a keyboard 425A as the digital input device 425 when the mobile device 405 is coupled to an external display.

In an embodiment, the integrated touch sensitive display 410 of the mobile device 405 may wait to receive information about the digital input device 425. In an embodiment, the information may cause the integrated touch sensitive display 410 on the mobile device 405 to display a digital input device 425. The information may cause the mobile device to function as the digital input device 425. For example, a user may select one or more digital input devices 425A, 425B, 425C to be presented on the integrated touch sensitive display 410 from a set, list and/or group of input devices. For example, the mobile device 405 may receive information that a user selected a keyboard 425A to be presented as the digital input device 425. As a result, the mobile device 405 may present a keyboard 425A as the digital input device 425 on the integrated touch sensitive display 410 and the mobile device 405 may function as a keyboard.

In an embodiment, a user may want to change the digital input device 425 presented on the integrated touch sensitive display 410 of the mobile device 405. In an embodiment, the integrated touch sensitive display 410 on the mobile device 405 may switch from displaying a first digital input device 425 to displaying a second digital input device 425. For example, a user may want to change from the keyboard 425A as the digital input device 425 to a track pad 425B as the digital input device 425. In an embodiment, the digital input device 425 displayed on the integrated touch sensitive display 410 may switch because an external device has been added to the mobile system.

Alternatively or in addition, a user may want to change to include multiple digital input devices 425 on the integrated touch sensitive display 410 of the mobile device 405. For example, a user may want to change to an integrated touch sensitive display 410 including a keyboard with a track pad 425C as the digital input device 425.

In an embodiment, an integrated touch sensitive display 410 on the mobile device 405 may switch back to being the primary display and may present at least a portion of the multimedia content 415 which is presented on the external display. When the integrated touch sensitive display 410 on the mobile device 405 switches to display the multimedia content 415, the integrated touch sensitive display 410 and the external display may have the same display.

Alternatively and/or in addition, an integrated touch sensitive display 410 on the mobile device 405 may present at least a portion of the multimedia content 415 which is presented on the external display. For example, the digital input device 425 may present a more detailed version of a portion of the media content 415 displayed on the external display screen.

Figure 5:
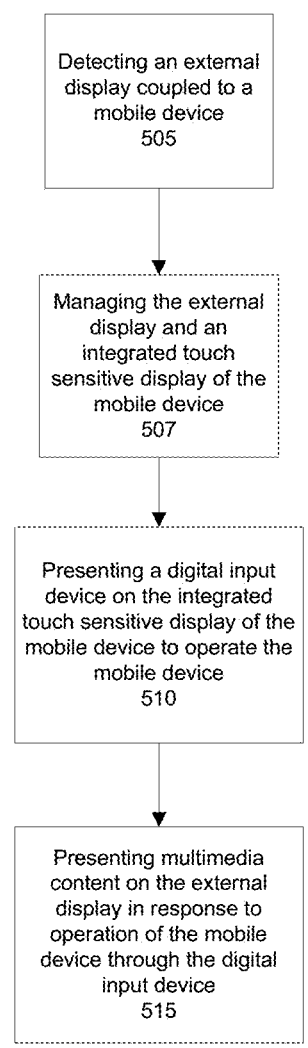
FIG. 5 illustrates an embodiment of a first exemplary logic flow.

FIG. 5 illustrates an embodiment of a first exemplary logic flow. Logic flow 500 may be representative of the operations executed by one or more embodiments described herein. It should be noted that the methods described herein do not have to be executed in the order described, or in any particular order. Moreover, various activities described with respect to the methods identified herein can be executed in serial or parallel fashion.

As shown in logic flow 500, an external display coupled to a mobile device may be detected 505. The mobile device may detect 505 that one or more external displays are coupled via a logic device 205, shown in FIG. 2. The logic device may detect that the mobile device is coupled to an external display via a wired connection. Examples of a wired connection include, but are not limited to, cables and/or cords. In an embodiment, the logic device may detect that the mobile device is coupled to an external display via a wireless connection. Examples of a wireless connection include, but are not limited to, Wireless Fidelity (WiFi) and/or Wireless Display (WiDi). The embodiments, however, are not limited to these examples.

Alternatively or in addition, the display manager 210, as shown in FIG. 2, in the mobile device may manage 507 the multiple display devices. In an embodiment, the mobile device may manage 507 an integrated touch sensitive display of the mobile device. In an embodiment, the mobile device may manage 507 one or more external displays.

In an embodiment, a digital input device may be presented 510 on the integrated touch sensitive display of the mobile device to operate the mobile device. For example, the integrated touch sensitive display of the mobile device may be a touch screen. A keyboard may be presented as the digital input device. The keyboard displayed on the integrated touch sensitive display may be used to operate the mobile device. The embodiments, however, are not limited to this example.

In an embodiment, multimedia content may be presented 515 to the external display of the mobile device in response to the operation of the mobile device through the digital input device. The multimedia content may be an application executed, or running on, the mobile device. As discussed above, multimedia content may include, but is not limited to, text, audio, video and images.

In an embodiment, the multimedia content may be presented on the integrated touch sensitive display of the mobile device prior to the mobile device being coupled to the external display. After the mobile device and the external display are coupled, the external display may present 515 the multimedia content. By presenting the multimedia content, the external display may become the primary display.

In an embodiment, the digital input device presented 510 on the integrated touch sensitive display of the mobile device may be different than the media content presented 515 on the external display. In other words, rather than having both the integrated touch sensitive display on the mobile device and the external display present the same multimedia content, once the mobile device detects 505 that that the mobile device is coupled to an external display device, the integrated touch sensitive display of the mobile device may present 510 a digital input device used to operate the mobile device.

In an embodiment, the mobile device may detect 505 multiple external displays coupled to the mobile device. In an embodiment, one or more of the external displays may present 515 the multimedia content in response to operation of the mobile device through the digital input device. For example, the external display may be a monitor and multiple monitors may present 515 the multimedia content. In an embodiment, one or more external displays may present 515 the same multimedia content simultaneously. For example, in a large ballroom, users may view various screens presenting 515 the same content, such as a movie.

Figure 6:
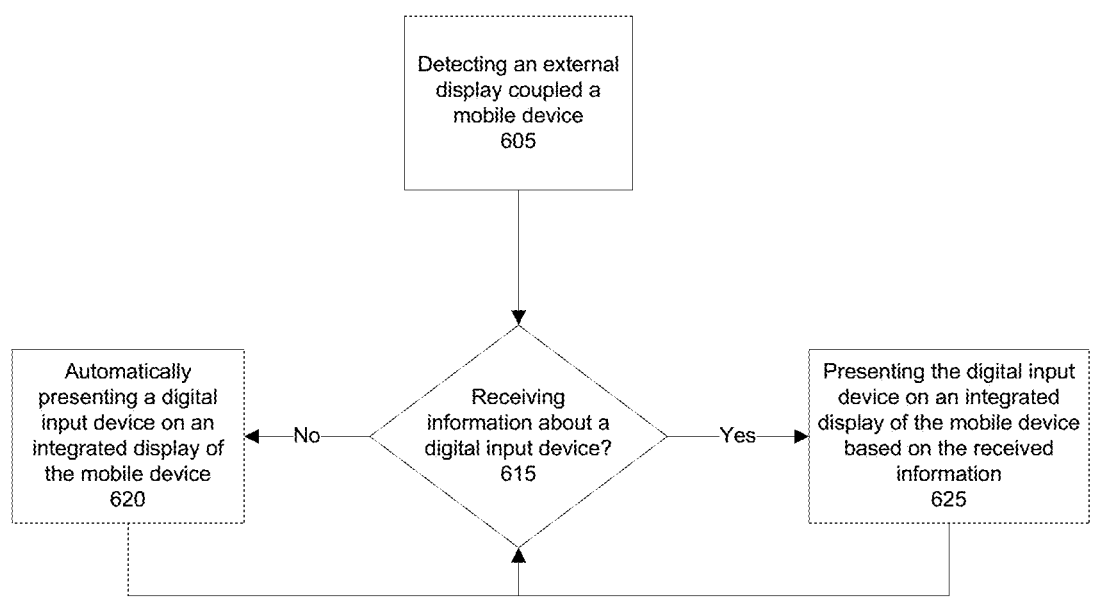
FIG. 6 illustrates an embodiment of a second exemplary logic flow.

FIG. 6 illustrates an embodiment of a second exemplary logic flow. Logic flow 600 may be representative of the operations executed by one or more embodiments described herein. It should be noted that the methods described herein do not have to be executed in the order described, or in any particular order. Moreover, various activities described with respect to the methods identified herein can be executed in serial or parallel fashion.

In an embodiment, once an external display coupled to a mobile device is detected 605, the mobile device may receive 615 information about a digital input device. In an embodiment, the mobile device may determine whether it received 615 information about a digital input device. In an embodiment, a time threshold may be used. The time threshold may be 5 seconds, 30 seconds, 1 minute, 2 minutes and or other time values. If no information is received during the threshold, then the mobile device may determine that no information was received 615.

In an embodiment, if the mobile device did not receive 615 information about a digital input device, then the integrated touch sensitive display may automatically present 620 a digital input device on the integrated touch sensitive display of the mobile device. For example, the integrated touch sensitive display of the mobile device may automatically present 620 a keyboard as the digital input device.

Alternatively or in addition, the integrated touch sensitive display of the mobile device may automatically present 620 a mouse as the digital input device. In an embodiment, the digital input device that is automatically presented 620 may be previously determined. In an embodiment, the digital input device that is automatically presented 620 may be randomly chosen from the one or more digital input devices that can be presented on the user interface device.

In an embodiment, a user may select a digital input device to present 625 on the integrated touch sensitive display of the mobile device. In an embodiment, after the mobile device detects 605 that it is coupled to an external display, the mobile device may receive 615 information about a digital input device and may present 625 the digital input device on the integrated touch sensitive display of the mobile device based on the received information.

In an embodiment, a user may provide the information received 615 by the mobile device about a digital input device by selecting a digital input device. For example, a user may touch a certain place on the integrated touch sensitive display which may cause the integrated touch sensitive display to display various digital input devices. In an embodiment, the integrated touch sensitive display may present a set, list and/or group of digital input devices. In an embodiment, in addition to the set, list or group of one or more digital input devices, the integrated touch sensitive display may also list an option of displaying all or a portion of the multimedia content.

In an embodiment, a user may provide the information received 615 by the mobile device by simply touching the integrated touch sensitive display. In an embodiment, the user may touch the integrated touch sensitive display of the mobile device with his/her finger to make a selection from a group, list and/or set. In an embodiment, the user may use a stylus or virtual pen to make a selection. The examples are not limited to the embodiments described.

In an embodiment, the mobile device may receive 615 information about a digital input device by receiving information that an external physical device was added to the mobile system. As a result of an added external physical device, the integrated touch sensitive display on the mobile system may present a digital input device which provides a more detailed version of a part of the external display screen. Alternatively and or in addition, as a result of an added external physical device, the integrated touch sensitive display on the mobile system may present a different digital input device. In an embodiment, the digital input device may complement the external physical device. For example, when a keyboard is coupled to a mobile device, the integrated touch sensitive display may present a mouse.

In an embodiment, a user may switch the digital input device presented on the integrated touch sensitive display of the mobile device. A user may hot swap the digital input device presented on the integrated touch sensitive display of the mobile device. In an embodiment, the mobile device may receive 615 information about a digital input device after a digital input device is automatically presented 620 on the integrated touch sensitive display of the mobile device. For example, a full size keyboard may be presented on the display. Information may be received 615 and a track pad may be hot swapped so that the tack pad is displayed on the integrated touch sensitive display. Additionally and/or alternatively, a mobile device may receive 615 information about a first digital input device and then receive 615 information about a second digital input device.

In an embodiment, the mobile device may change the integrated touch sensitive display to present 625 the input device based on the received information. For example, the integrated touch sensitive display of the mobile device may automatically present 620 a keyboard when the mobile device is coupled to the external display. After a user used the mobile device as a keyboard, a user may want the integrated touch sensitive display to present 625 a track pad as the digital input device. In an embodiment, the mobile device may receive information 615 about a digital input device. For example, the mobile device may receive 615 information that a user selected a track pad as the digital input device. The mobile device may present 625 the tack pad on the integrated touch sensitive display.

Alternatively or in addition to, the mobile device may receive 615 information that the integrated touch sensitive display should present all or a portion of the multimedia content. The mobile device may present all or a portion of the multimedia content on the integrated touch sensitive display. In an embodiment, an enlarged or more detailed portion of the multimedia content may be presented on the integrated touch sensitive display as the digital input device.

Figure 7:
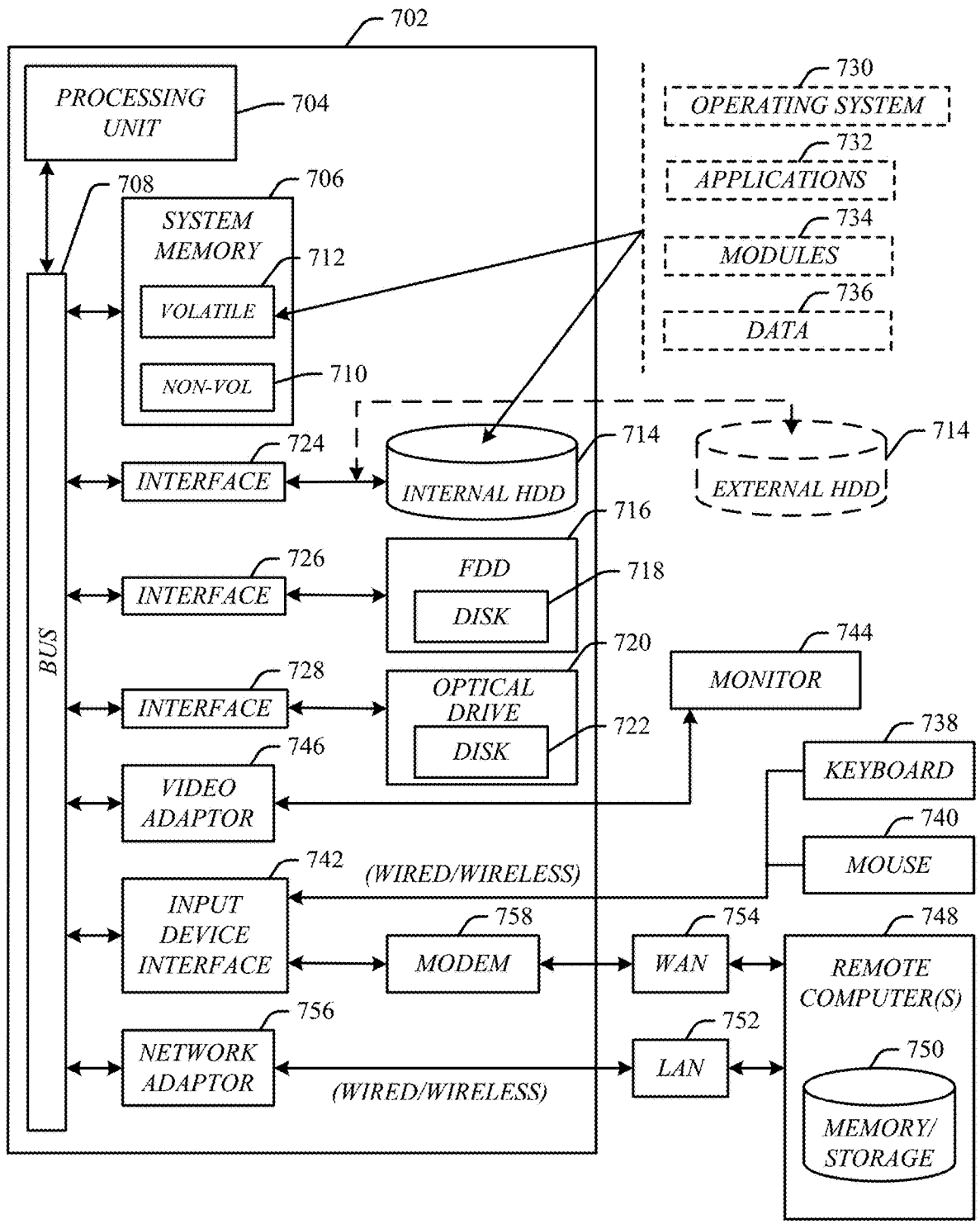
FIG. 7 illustrates an embodiment of an exemplary computing architecture.

FIG. 7 illustrates an embodiment of an exemplary computing architecture 700 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be coupled to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the decoder.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network device, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system comprising:
   a remote control to control an external display, the remote control external to the external display and comprising:
      a plurality of input buttons; and
      a wireless transmitter coupled to the plurality of input buttons, the wireless transmitter to send a first control signal comprising an indication of a first command to control the external display based on an interaction with one or more of the plurality of input buttons; and
   at least one non-transitory computer-readable storage medium comprising a set of instructions that, in response to being executed by a processor of a mobile device, the mobile device different from the remote control and comprising a touch sensitive display, cause the processor to:
      present a digital input on the touch sensitive display of the mobile device, the digital input comprising at least one digital input button to control the external display different than the plurality of input buttons,
      detect interaction with the at least one digital input button, and
      transmit, via a wireless network, a second control signal comprising an indication of a second command to control the external display, the second command different than the first command.

2. The system of claim 1, wherein the second control signal to be transmitted to the external display via Wi-Fi.

3. The system of claim 1, the digital input comprising a plurality of input buttons different than the plurality of input buttons of the remote control.

4. The system of claim 1, the at least one non-transitory computer-readable storage medium comprising instructions that, in response to being executed by the processor of the mobile device, cause the processor to:
   detect the external display; and
   receive information to include an indication of the at least one digital input button to control the external display.

5. The system of claim 1, the at least one non-transitory computer-readable storage medium comprising instructions that, in response to being executed by the processor of the mobile device, cause the processor to present a second digital input on the touch sensitive display of the mobile device, the second digital input to control the external display.

6. The system of claim 5, the at least one non-transitory computer-readable storage medium comprising instructions that, in response to being executed by the processor of the mobile device, cause the processor to:
   receive information to include an indication of the second digital input to control the external display; and
   switch presenting the digital input to presenting the second digital input.

7. The system of claim 1, wherein the at least one digital input button augments the plurality of input buttons.

8. A method for a mobile device, comprising:
   receiving information to include an indication of a digital input to control an external display;
   presenting the digital input on a touch sensitive display of a mobile device, the digital input comprising at least one digital input button to control the external display different than a plurality of input buttons of a remote control, the remote control different from the mobile device and arranged to control the external display and comprising the plurality of input buttons, the remote control and the mobile device external to the external display;
   detecting interaction with the at least one digital input button; and transmitting, via a wireless network, a control signal comprising an indication of a command to control the external display.

9. The method of claim 8, comprising transmitting the control signal to the external display via Wi-Fi.

10. The method of claim 8, the digital input comprising a plurality of input buttons different than the plurality of input buttons of the remote control.

11. The method of claim 8, comprising detecting the external display and receiving the information to include an indication of the digital input to control the external display in response to detecting the external display.

12. The method of claim 8, comprising presenting a second digital input on the touch sensitive display of the mobile device, the second digital input to control the external display.

13. The method of claim 12, comprising:
receiving information to include an indication of the second digital input to control the external display; and
switching presenting the digital input to presenting the second digital input.

14. The method of claim 8, wherein the at least one digital input button augments the plurality of input buttons.

15. At least one non-transitory computer-readable storage medium, comprising a set of instructions that, in response to being executed by a processor of a mobile device, cause the processor to:
receive information to include an indication of a digital input to control an external display;
present the digital input on a touch sensitive display of the mobile device, the digital input comprising at least one digital input button to control the external display different than a plurality of input buttons of a remote control, the remote control different from the mobile device and arranged to control the external display and comprising the plurality of input buttons, the remote control and the mobile device external to the external display;
detect interaction with the at least one digital input button; and
transmit, via a wireless network, a control signal comprising an indication of a command to control the external display.

16. The at least one non-transitory computer-readable storage medium of claim 15, comprising instructions that, in response to being executed by the processor, cause the processor to transmit the control signal to the external display via Wi-Fi.

17. The at least one non-transitory computer-readable storage medium of claim 15, the digital input comprising a plurality of input buttons different than the plurality of input buttons of the remote control.

18. The at least one non-transitory computer-readable storage medium of claim 15, comprising instructions that, in response to being executed by the processor, cause the processor to:
detect the external display; and
receive the information to include the indication of the digital input to control the external display in response to detecting the external display.

19. The at least one non-transitory computer-readable storage medium of claim 15, comprising instructions that, in response to being executed by the processor, cause the processor to present a second digital input on the touch sensitive display of the mobile device, the second digital input to control the external display.

20. The at least one non-transitory computer-readable storage medium of claim 19, comprising instructions that, in response to being executed by the processor, cause the processor to:
receive information to include an indication of the second digital input to control the external display; and
switch presenting the digital input to presenting the second digital input.

21. The at least one non-transitory computer-readable storage medium of claim 15, wherein the at least one digital input button augments the plurality of input buttons.

22. A mobile device comprising:
a touch sensitive display;
a processor coupled to the touch sensitive display; and
memory coupled to the processor, the memory to store a set of instructions that, in response to being executed by the processor, cause the processor to:
receive information to include an indication of a digital input to control an external display remote from the mobile device;
present the digital input on a touch sensitive display, the digital input comprising at least one digital input button to control the external display different than a plurality of input buttons of a remote control, the remote control different from the mobile device and arranged to control the external display and comprising the plurality of input buttons;
detect interaction with the at least one digital input button; and
transmit, via a wireless network, a control signal comprising an indication of a command to control the external display.

23. The mobile device of claim 22, comprising a Wi-Fi interface coupled to the processor, the memory comprising instructions that, in response to being executed by the processor, cause the processor to transmit the control signal to the external display via the Wi-Fi interface.

24. The mobile device of claim 22, the digital input comprising a plurality of buttons different than the plurality of input buttons of the remote control.

25. The mobile device of claim 22, the memory comprising instructions that, in response to being executed by the processor, cause the processor to:
detect the external display; and
receive the information to include the indication of the digital input to control the external display in response to detecting the external display.

26. The mobile device of claim 22, the memory comprising instructions that, in response to being executed by the processor, cause the processor to present a second digital input on the touch sensitive display, the second digital input to control the external display.

27. The mobile device of claim 26, the memory comprising instructions that, in response to being executed by the processor, cause the processor to:
receive information to include an indication of the second digital input to control the external display; and
switch presenting the digital input to presenting the second digital input.

28. The mobile device of claim 22, wherein the at least one digital input button augments the plurality of input buttons.

* * * * *